United States Patent
Helbert

(10) Patent No.: US 9,319,944 B2
(45) Date of Patent: Apr. 19, 2016

(54) MULTI-MODE MOBILE TELEPHONE TERMINAL ALLOWING THE TRANSFER OF A TELEPHONE CALL FROM ONE WIRELESS NETWORK TO ANOTHER

(71) Applicant: Alcatel Lucent, Boulogne Billancourt (FR)

(72) Inventor: Emmanuel Helbert, Illkirch (FR)

(73) Assignee: Alcatel Lucent, Boulogne-Billancourt (FR)

( * ) Notice: Subject to any disclaimer, the term of this patent is extended or adjusted under 35 U.S.C. 154(b) by 95 days.

(21) Appl. No.: 14/345,710

(22) PCT Filed: Sep. 27, 2012

(86) PCT No.: PCT/EP2012/069067
§ 371 (c)(1),
(2) Date: Mar. 19, 2014

(87) PCT Pub. No.: WO2013/045542
PCT Pub. Date: Apr. 4, 2013

(65) Prior Publication Data
US 2014/0226628 A1    Aug. 14, 2014

(30) Foreign Application Priority Data
Sep. 30, 2011 (EP) .................................... 11306257

(51) Int. Cl.
*H04W 4/00* (2009.01)
*H04W 36/00* (2009.01)
(Continued)

(52) U.S. Cl.
CPC ........ *H04W 36/0022* (2013.01); *H04M 7/1225* (2013.01); *H04W 36/0011* (2013.01); *H04W 88/06* (2013.01); *H04W 36/14* (2013.01); *H04W 88/02* (2013.01); *H04W 92/04* (2013.01)

(58) Field of Classification Search
None
See application file for complete search history.

(56) References Cited

U.S. PATENT DOCUMENTS

| 2006/0198347 A1* | 9/2006 | Hurtta et al. ................... 370/338 |
| 2006/0229068 A1* | 10/2006 | Niemela et al. ............ 455/426.1 |
| 2011/0039562 A1* | 2/2011 | Balasubramanian et al. 455/436 |

FOREIGN PATENT DOCUMENTS

| WO | WO 2007/033485 A2 | 3/2007 |
| WO | WO 2010/091295 A2 | 8/2010 |

OTHER PUBLICATIONS

International Search Report for PCT/EP2012/069067 dated Oct. 26, 2012.

*Primary Examiner* — Minh-Trang Nguyen
(74) *Attorney, Agent, or Firm* — Fay Sharpe LLP

(57) ABSTRACT

A multimode mobile telephone terminal (T1) allowing the transfer of a telephone call from one wireless network to another, comprising: an interface (CSI) for supporting circuit-switched calls, an interface (PSI) for supporting packet-switched calls, a call transfer manager (HOM) for deciding on call transfers, an access monitor (ACM) for activating or deactivating the devices (D1-D4, . . . etc.) that said interfaces (CSI and PSI) comprise, based on: information on the state of those devices' availability, the type and state of the radio connectivity offered by the terminal, and preferences defined by a user or mobile fleet administrator; a call manager (CH) for: managing the calls presented to the user based on the current status of each of the devices (D1-D4 . . . etc.) that the interface (CSI) comprises to support circuit-switched calls, and that the interface (PSI) comprises to support packet-switched calls, and managing the switchover of a multimedia session, should the need arise, from one device (D1-D4 . . . etc.) to another based on signals from the call transfer manager (HOM); This call manager (CH) comprises an abstraction layer (AL) that makes it possible to exchange generic commands and generic information with any communication device D1-D4 . . . etc that the interface (CSI) may comprise to support circuit-switched calls, and that the interface (PSI) may comprise to support packet-switched calls.

4 Claims, 9 Drawing Sheets

(51) Int. Cl.
*H04M 7/12* (2006.01)
*H04W 88/06* (2009.01)
*H04W 88/02* (2009.01)
*H04W 92/04* (2009.01)
*H04W 36/14* (2009.01)

MULTI-MODE MOBILE TELEPHONE TERMINAL ALLOWING THE TRANSFER OF A TELEPHONE CALL FROM ONE WIRELESS NETWORK TO ANOTHER

The invention pertains to a multi-mode mobile telephone terminal that allows the transfer of a telephone call from one wireless network to another; for example, from a GSM wireless global telecommunication network to a wireless local telecommunication network, of the SIP over WiFi type, and vice versa. It is also applicable to a transfer from one global wireless network to another global wireless network, for example from an XMPP/LTE (Extensible Messaging and Presence Protocol/Long Term Evolution) network to a GSM network, and vice versa.

A conventional dual-mode mobile telephony terminal has two radio interfaces, used respectively to communicate via a wireless telecommunication global network, in accordance with the GSM standard, and/or via a wireless telecommunication local area network, in accordance with the Wi-Fi standard, the latter being connected to a fixed public telecommunication network by a permanent link using the Internet protocol (called an IP link in the remainder of this document), which allows Voice Over Internet Protocol (Voice Over IP, VOIP) type telephone calls.

A global wireless network offers worldwide coverage, but calls are expensive. A wireless local area network offers more limited coverage, included within the previous coverage, but the VoIP calls are inexpensive. For example, a shopping center or an airport may be equipped with a wireless local area network, accessible to the public. When a wireless local area network covers the site of a company, or the apartment of an individual, the use of this local area network must be preferred for telephone calls given its low cost. Additionally, the use of that local area network within buildings improves radio coverage, and thereby improves user experience. Finally, the broadband access offered by the wireless local area network makes it possible to establish and manage communication sessions that may comprise a video stream or simply using a broadband voice encoder. Since the terminal is mobile, the problem arises of transferring a telephone call between the two networks, without interrupting that telephone call, and without an annoying delay for the users.

A service called Voice Call Continuity (VCA) is known, which makes it possible to transfer a call from one global wireless network to a wireless local area network. A first drawback of this method is that it is only applicable within IMS (IP MultiMedia Subsystem) networks. A second drawback is that it requires a roaming agreement between the operators who respectively manage the two usable networks. This is generally not true when the wireless local area network belongs to a company.

The document WO 2007/033485 describes a method for transferring a telephone call from a GSM network to WiFi network, and vice versa. In order to transfer to the GSM network a call established with any second terminal, if that call had been established via the WiFi local area network, the dual-mode terminal orders the establishing of a second call via the GSM network between that dual-mode terminal and a telephone conference gateway. Next, it orders the conferencing of those two calls, then the releasing of the call via the WiFi network, allowing the call to continue via the GSM network. To transfer to the WiFi local area network a call that had been established via the GSM network, the method is similar: it consists of the dual-mode terminal ordering a conferencing with a new call via the GSM network, then releasing the call via the GSM network. This document also describes a dual-mode terminal comprising a call manager implementing that method. In order to carry out a call transfer according to this known method, this call manager uses the WiFi/SIP and GSM protocol stacks natively available on the terminal.

This terminal's drawback is that the call management lacks the flexibility to be adaptable to different types of networks. It is closely linked to the SIP (Session Initiation Protocol) and GSM protocols: call management, and in particular call transfer, is specially designed for a WiFi/SIP link and a GSM link. This is because the call transfer relies on the REFER command, which is a message of the SIP protocol. Thus, it is not possible to adapt this call manager to allow a call transfer between networks using different SIP and GSM protocols. Most importantly, it does not allow a user to easily adapt that call manager on his or her own initiative, by downloading and installing an application on the terminal after the terminal's acquisition.

Furthermore, such a call manager does not make it possible to initiate a call transfer on the initiative of a third-party application, such as an application run on a geolocation server, because that call manager is located within the terminal to which the call was transferred. This is because, for reasons related to the short life of radio connections, it is more robust to locate the decision to initiate the call transfer within the network core, relying on observations of the state of the mobile terminal's connection. A geolocation server may allow this.

Another drawback of this terminal is that it does not make it possible to manage the terminal's mobility between wireless networks that support different communication protocols whenever that terminal is not in the calling phase, because the REFER command only applies for existing SIP sessions. Thus, routing management is not possible for calls addressed to that terminal. Such calls will always be made on the interface whose availability is most likely (the wireless global network, in this case).

The purpose of the invention is to propose a multimodal terminal that does not have these drawbacks.

The object of the invention is a multimodal mobile telephone terminal that makes it possible to transfer a telephone call from one wireless network to another, comprising:
  an interface for supporting circuit-switched calls, comprising a plurality of communication devices corresponding to different protocols for circuit-switched calls,
  an interface for supporting packet-switched calls, comprising a plurality of communication devices corresponding to different protocols for packet-switched calls,
  a call transfer manager for deciding on call transfers,
  an access monitor that activates or deactivates the devices that said interfaces comprise, depending on:
    information on the state of those devices' availability,
    the type and state of the radio connectivity offered by the terminal,
    and preferences defined by a user or mobile fleet administrator;
  a call manager for:
    managing calls presented to the user based on the current status of each of the devices that the interface for supporting circuit-switched calls, and the interface for supporting packet-switched calls, both comprise
    and managing the switchover of a session, should the need arise, from one communication device to another based on signals from the call transfer manager;
  characterized in that the call manager comprises an abstraction layer that makes it possible to exchange generic commands and generic information with any communication device that the interface for supporting circuit-switched calls, and the interface for supporting packet-switched calls, both may comprise.

The terminal characterized in this way may easily be adapted to allow a call transfer between networks using different SIP and GSM protocols, because the abstraction layer makes it possible to exchange commands and generic information with any new communication device. In particular, a user may download and then install new communication devices after acquiring the terminal.

The terminal characterized in this way makes it possible to manage a call transfer initiated by a third-party application that may be hosted on any type of machine or server, such as an application run on a geolocation server, because the call manager, through the abstraction that connects the communication devices, is capable of matching the information given by those devices to the call being transferred and thereby to decide how to pick up and hang up on calls on said communication devices in order to maintain the continuity of the call.

The terminal characterized in this way makes it possible to manage the mobility of the terminals between wireless networks that support different communication protocols, even when the terminal is not in a communication phase, because the access monitor is capable of controlling the communication devices depending on the terminal's current environment. It is particularly able to activate one or more communication devices as soon as it detects the presence of a new wireless connection for supporting the communication protocol(s) managed by the communication devices installed within the terminal. Furthermore, the access monitor is able to activate or deactivate one or more communication devices based on notifications received from a third party application such as a terminal fleet management application.

The invention will be better understood and other characteristics will become apparent with the help of the description below and the accompanying figures.

Figure 1:
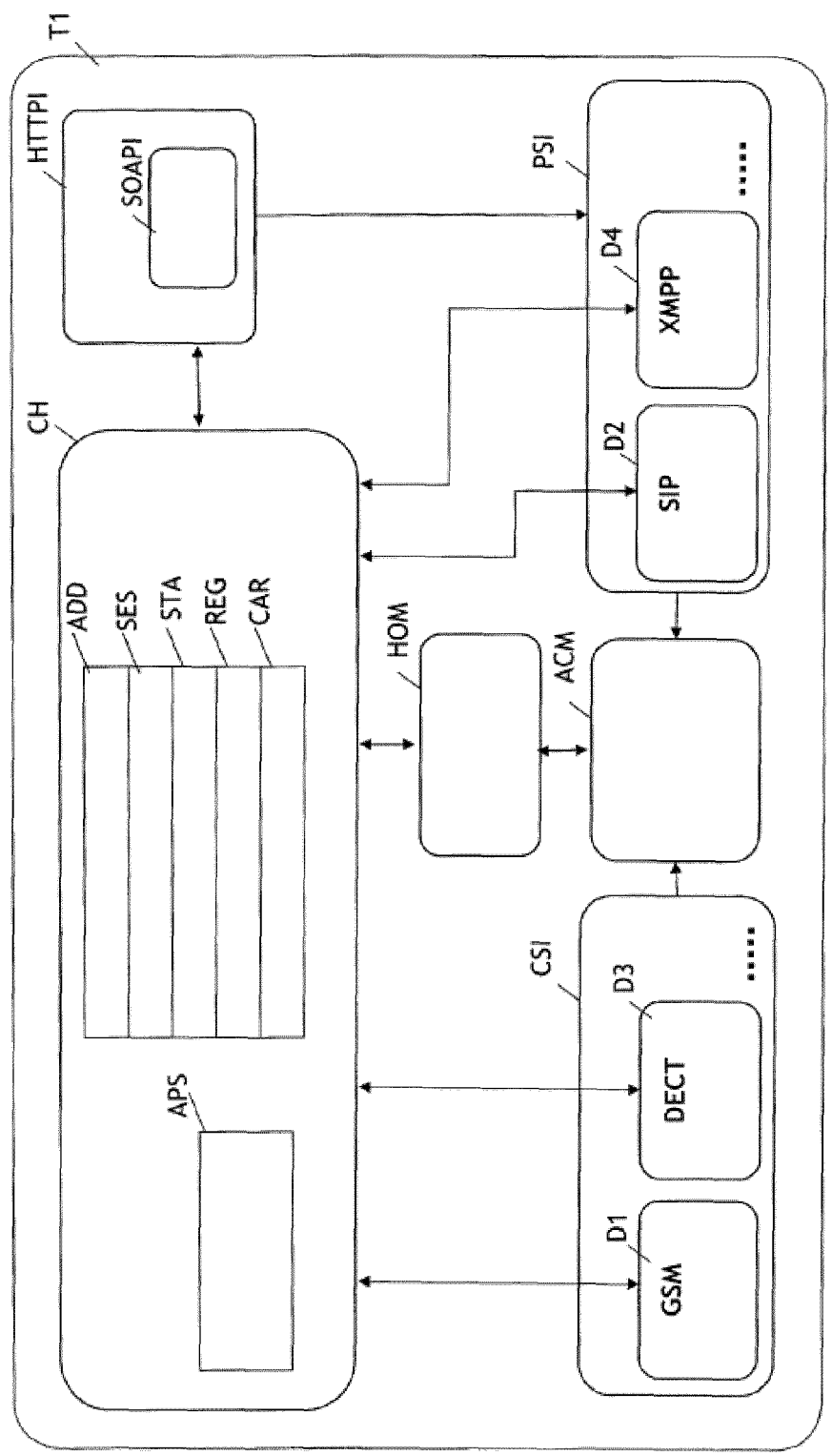
FIG. 1 shows the block diagram of an example embodiment of the inventive terminal.

In FIG. 1, an example embodiment T1 of the inventive terminal comprises:

An interface CSI that supports circuit-switched calls. For example, it comprises a GSM communication device D1, but it may also comprise a communication device D3 for DECT (Digital Enhanced Cordless Telephone) calls, a communication device for DECT (Digital Enhanced Cordless Telephone) calls, CDMA, etc.

An interface PSI that supports packet-switched calls. For example, it comprises a SIP communication device D2, but it may also comprise a communication device D4 for XMPP (Googletalk) or SKYPE calls on an LTE network, etc. It supports a data transmission protocol, for example HTTP (Hypertext Transfer Protocol). Some of these communication devices were downloaded and installed by the user after the terminal was purchased.

A call transfer manager, HOM, which decides how to hand over calls depending on the circumstances (presence of this or that wireless network).

An access monitor ACM that enables or disables the devices D1-D4, . . . etc. which the interfaces CSI and PSI comprise, based on those devices' availability status information as well as preferences defined by the user or a mobile fleet administrator, using identifiers defined in the communication protocols For example: the IMEI identifier (International Mobile Equipment Identity) for a GSM device, the URI identifier (Universal Resource Identifier) for a SIP device, the MEID identifier (Mobile Equipment IDentity) for a CDMA device, depending on the call transfer decisions of the call transfer manager, HOM. The access monitor ACM indicates to it the current status of the communication devices D1-D4 etc. The access monitor ACM is thereby capable of controlling the communication devices based on the terminal's current environment. It is particularly able to activate one or more communication devices as soon as it detects the presence of a new wireless connection for supporting the communication protocol(s) managed by the communication devices installed within the terminal. Furthermore, it is able to activate or deactivate one or more communication devices based on notifications received from a third party application such as a terminal fleet management application. The access monitor ACM also makes it possible to retrieve and transmit to the call manager CH the events issued by the devices D1-D4, etc. for which the access monitor ACM had been saved.

A data transmission interface, HTTPI, which supports the HTTP protocol.

A call manager CH, which manages the multimedia calls presented to the user based on the current status of each of the devices D1-D4 . . . etc. It manages the switchover of a multimedia session, should the need arise, from one device D1-D4 to another based on signals from the call transfer manager HOM: It comprises software means APS to associate a plurality of multimedia sessions established by means of the communication devices D1-D4 etc. with a single call currently being transferred. This call manager CH controls the devices D2, D4, . . . etc. of the interface PSI for sending and receiving data, going to and coming from an application server (located within a network) via the data transmission interface, HTTPI, and potentially via an interface SOAPI supporting the SOAP (Simple Object Access Protocol) protocol. The call manager CH comprises an abstraction an abstraction layer that makes it possible to exchange generic commands and generic information with any communication device D1-D4 etc. that the terminal may comprise. Thanks to this abstraction layer, it is capable of managing all sorts of communication devices D1-

D4, . . . etc, meeting all sorts of protocol stacks, particularly protocol stacks downloaded by the user.

According to one preferential embodiment, the abstraction layer AL that makes it possible to exchange generic commands comprises:
- software means AAD for activating and deactivating the communication devices D1-D4 . . . etc.,
- software means SES for initiating, accepting, and ending a multimedia session;
- software means STA for checking the current state of multimedia sessions managed by the communication devices, and thereby retrieving events. These means STA enable the call manager CH to retrieve events issued by the devices D1-D4 . . . etc for which the call manager CH had been saved.
- software means REG for registering the access monitor with the communication devices D1-D4 . . . etc in order to be able to transmit to the access monitor (ACM) notifications related to the current state of the communication devices.
- and software means CAR for characterizing multimedia sessions established by way of the communication devices D1-D4 . . . etc in order to make it possible to associate said sessions with a single call currently being transferred.

Figure 2:
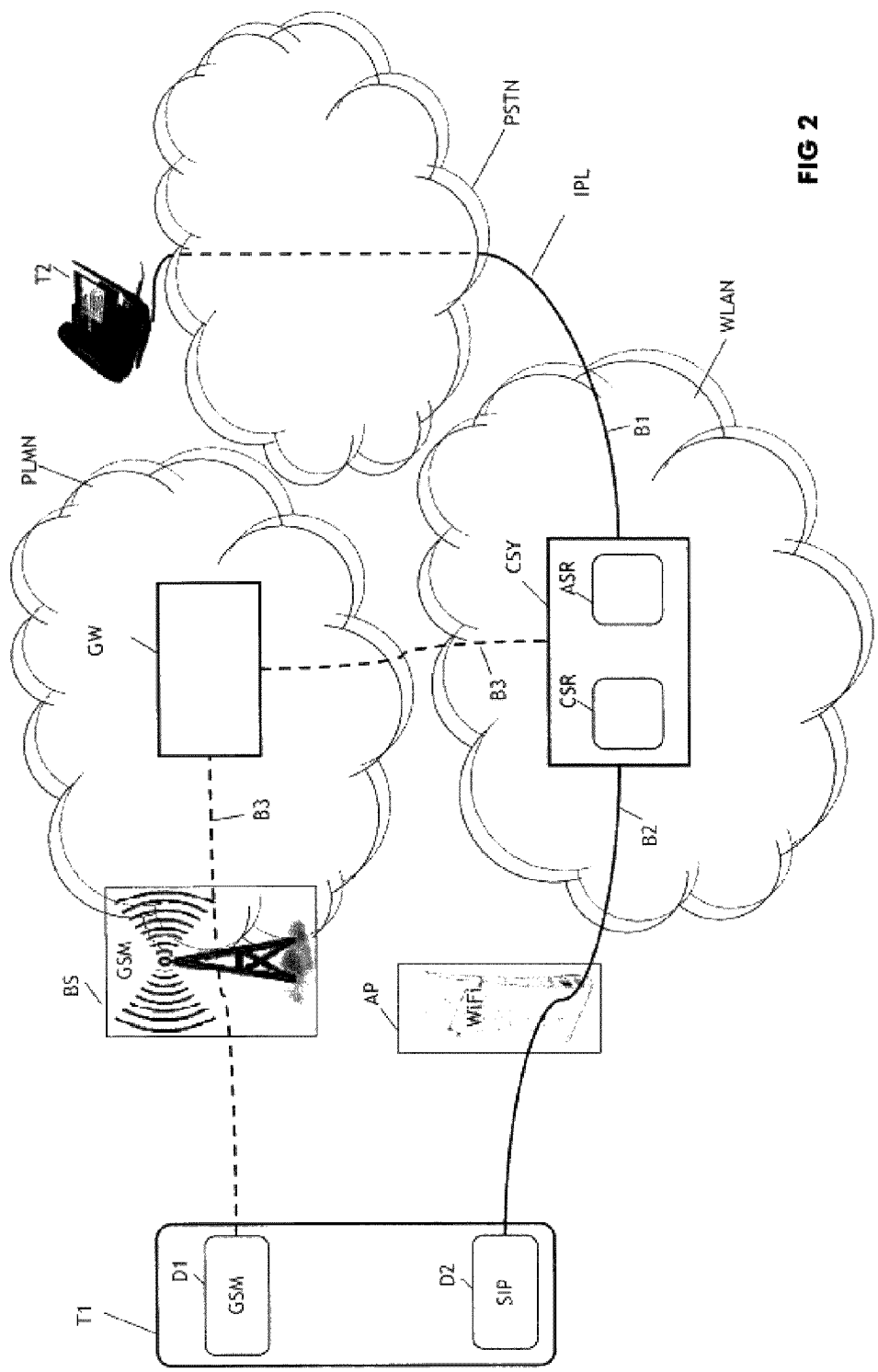
FIG. 2 depicts one example of using a terminal according to the invention.

In a first example use, illustrated by FIG. 2, the mobile telephone terminal T1 is used in SIP/WiFi mode, then in GSM mode. Its GSM device D1 that enables it to connect to a wireless global network PLMN, of the GSM type, and its SIP device D2 that enables it to connect to a wireless global network WLAN, of the WiFi type and using the signaling protocol SIP (Session Initialization Protocol). This wireless local area network WLAN belongs, for example, to a company.

The local area network WLAN comprises a company communication system CSY linked to radio access points AP by a wired Ethernet network, not shown here. This communication system CSY is capable of switching voice or video calls to Internet protocol, within the local area network WLAN, while providing additional services, particularly by allowing conferences with three or more people. To do so, it comprises a communication server CSR and an application server ASR.

The communication system CSY of the local area network WLAN is connected to the public fixed-line network PSTN by a link IPL that uses Internet protocol (IP). A gateway (not shown) is incorporated into the public network PSTN in order to form the interface between that link IPL and conventional, analog terminals connected to that public network PSTN.

The communication system CSY of the local area network WLAN is connected to the wireless global network PLMN by another link using Internet protocol. A gateway GW is incorporated into the global network PLMN in order to form the interface between that IP and that GSM network.

At the moment in question, the terminal T1 is entirely within the coverage area of the local area network WLAN. A call is underway via the local area network WLAN. That local area network WLAN was chosen over the global network PLMN in order to enjoy a better price. The network is selected by a known automatic method. The communication system CSY established a connection that comprises a branch B1 linking the communication system CSY to the public fixed-line network PSTN by the link IPL, and a branch B2 linking the communication system CSY to the terminal T1 by the radio access point AP.

Afterward, the mobile terminal T1 is moving and approaches the boundary of the radio coverage of the local area network WLAN. The GSM device D1 of the dual-mode terminal T1 periodically listens to the GSM base stations that it can capture. The terminal T1 thereby knows that it can establish communication via a base station BS in this example. It then asks the communication system CSY to perform a call transfer from the local area network WLAN to the global network PLMN. The communication system CSY then makes a connection between the branch B2 and a new branch B3 that connects it to the base station BS, via a gateway GW within the global network PLMN.

The mobile terminal T1 therefore receives a call notification, on the device D1, in the conventional manner. It receives signaling data containing the called party number and the caller number. The terminal T1 comprises means to:
- analyzing this calling number,
- detect whether the caller number is identical to the called party number (its own number),
- and if it is, it accepts a second call without ringing.

The communication system CSY then creates a conference between that second call B2-B3 and the first call B1-B2, in a manner conventional for a three-party conference. The dual-mode terminal T1 is then simultaneously in communication with the terminal T2 through two telephone calls, B1-B2 and B1-B3, placed in a conference.

The communication system CSY then releases the first call, releasing the branch B2. It maintains the connection between the branch B3 and the branch B1. The second call B1-B3 replaces the first call without any annoyance for the users: There is no interruption because the two calls coexist for a certain period of time.

For the users, everything occurs as if the radio segment of the call had been transferred instantly from the local area network WLAN to the global network PLMN. It should be noted that the call continues to go through the automatic exchange CSY, and therefore the user of the terminal T1 continues to benefit from the services that that system can provide.

Let us consider the reverse transfer case, meaning from the global network PLMN to the local area network WLAN. The Wi-Fi device D2 of the dual-mode terminal T1 is periodically listening to WiFi access points. The terminal T1 asks the communication system CSY to carry out a call transfer procedure from the global network PLMN to the local area network WLAN whenever it detects that it is in the coverage area of the local area network WLAN, and that it has verified that it has the right to access that network. The Wi-Fi device D2 of the dual-mode terminal T1 is associated with the access point AP, for example, and is then authenticated by the local area network WLAN, according to a known method. The terminal T1 signals its presence the communication system CSY the automatic exchange PBX. The automatic exchange PBX knows that the terminal T3 is associated with the access point AP3, through a traditional method. It is now able to route a call to that terminal T1, if that terminal T1 is being called or if it is in a call. The transfer of a call from the global network PLMN to the local area network WLAN is carried out in a manner analogous to that described above: The communication system CSY temporarily creates a three-party conference, then releases the branch that is no longer needed. During that time, the terminal T1 continues to communicate with the terminal T2 via the base station BS, the global wireless network PLMN, and the public fixed-line network PSTN. There is therefore no interruption.

Figure 3:
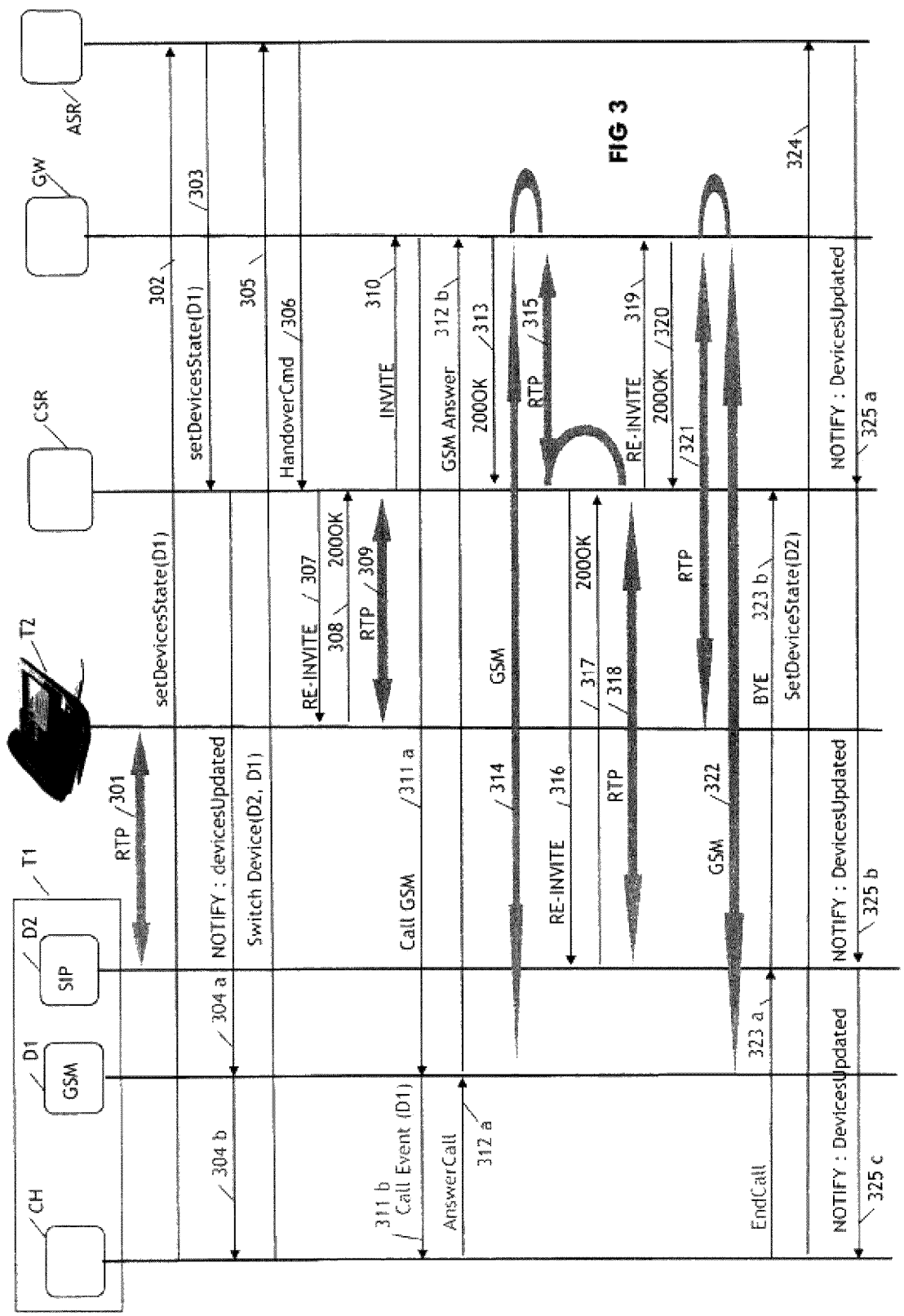
FIG. 3 depicts signal exchanges within an example call transfer from a SIP/Wi-Fi network to a GSM network, triggered by the terminal.

FIG. 3 depicts signal exchanges in an example call transfer from a SIP/WiFi local area network to a GSM global network, triggered by the terminal:
- 301: A VOIP call was established between the SIP device D2 of the terminal T1 and any terminal T2 linked to the public fixed-line network PSTN. This call uses the RTP protocol to carry voice signals.

302: The terminal T1 detects that it is leaving the coverage area of the SIP/WIFI network. The call manager CH of the terminal T1 then activates the GSM device D1 and decides to trigger a call transfer from the local area network SIP/WiFi to the global network GSM. In order to order the communication server CSR to make that transfer, the call manager CH since the application server ASR, via the GSM device D1, a "SetDevicesState (D1)" message. This message contains the IMEI (International Mobile Equipment Identity) identifier of the GSM device D1. This message is interpreted by the application server ASR as meaning that the GSM device D1 has been activated. In other words, a call may go through the global network GSM.

303: The application server ASR retransmits the "SetDevicesState (D1)" message to the communication server CSR.

304 a: The communication server CSR sends a "NOTIFY: DevicesUpdated" message to the GSM device D1 to indicate that it recorded that the GSM device D1 has been activated.

304 b: The GSM device D1 retransmits that "NOTIFY: DevicesUpdated" message to the call manager CH. According to one variant, this message may be sent directly from the communication server CSR to the call manager CH by means of the data transmission and reception interface HPI that uses the interface PSI.

305: The call manager CH sends the application server ASR, via the data transmission interface HTTPI and the interface PSI, a message "switchDevice (D2, D1)" in order to request that the call be transferred to the GSM network.

306: The application server ASR then sends a "HandoverCmd" message to the communication server CSR. This message is interpreted by the application server ASR as meaning that it must transfer (hand over) a call to the GSM device D1 that had just been activated.

307: The communication server CSR transfers the call, starting by establishing a new call between the terminal T2 and the terminal T1 via the global network GSM, by sending a "RE-INVITE" message to the terminal T2. This message asks for its permission to modify the current session in order to create a three-party conference.

308: The terminal T2 responds with a 200OK acceptance message.

309: A new call, supported by the RTP protocol, is then established between the terminal T2 and the communication server CSR, via a gateway not shown here, incorporated into the public land-line network PSTN.

310: The communication server CSR sends an "INVITE" message to the gateway GW, in order to establish a new communication via the global network GSM.

311 a: The gateway GW sends a "Call GSM" message to the GSM device D1 of the terminal T1.

311 b: The GSM device D1 then sends a "Call Event (D1)" message to the call manager CH in order to inform it of an incoming call.

312 a: The call manager CH responds to the GSM device D1 with a "Answer Call" message that orders it to take the call.

312 b: The GSM device D1 takes the call: It responds by sending the gateway GW a "GSM Answer" message.

313: The gateway GW converts that "GSM Answer" message into a "200OK" message that it sends to the communication server CSR.

314, 315: A new call is established between the GSM device D1 of the terminal T1, and the communication server CSR, via the gateway GW. A first GSM part, denoted 314, of that new call uses the GSM protocols to transport voice signals between the GSM device D1 of the terminal T1 and the gateway GW. A second VOIP part, denoted 315, of that new call uses the RTP protocol to transport voice signals from the gateway GW to the communication server CSR.

316: The communication server sends a "RE-INVITE" message to the SIP device D2 of the terminal T1 in order to request a change to the current session, in order to create a three-party conference.

317: The SIP device D2 accepts by sending a "200OK" message to the communication server CSR.

318: Another new VOIP call is established between the communication server CSR and the SIP device D2 of the terminal T1. This call uses the RTP protocol to carry voice signals. Temporarily, the communication server CSR connects those two calls 314-315 and 318 so that the terminal T2 is conferencing with the GSM device D1 and the SIP device D2 of the terminal T1. The terminal T1 connects its human-machine interfaces (microphone, monitor, video player) to the GSM device D1.

319: The communication server sends a "RE-INVITE" message to the gateway GW in order to change the sessions that are underway so that the call between the GSM device D1 and the terminal T2 no longer goes through a communication server CSR but rather only through the gateway GW.

320: The gateway responds with a "200OK" message.

321, 322: A call then links the terminal T2 and the GSM device D1 via the gateway GW. A part 321 of that call, between the terminal T2 and the gateway GW, is supported by the RTP protocol. A second part of that call 322, between the gateway GW and the GSM device D1 of the terminal T1, is supported by the GSM protocols. A new call is therefore established between the terminals T1 and T2, going through the global network GSM.

323 a: The call manager CH ends the existing call between the terminal T2 and the SIP device D2 by sending an "EndCall" message to that SIP device D2.

323 b: The SIP device D2 then sends a "BYE" message to the communication server CSR in order to ask it to release the communication 318 via the SIP/WIFI local area network.

324: The call manager CH additionally sends a "SetDeviceState (D2)" message to the application server ASR, via data transmission interface HTTPI and PSI, to indicate that the SIP device D2 will be deactivated. This message may also be replaced by an UNREGISTER SIP message that indicates that the SIP device D2 is no longer accessible. The application server ASR saves this state change of the SIP device D2 of the terminal T1.

325 a: The application server ASR acknowledges receipt by sending a "NOTIFY: DevicesUpdated" message to the communication server CSR. The communication server CSR saves this state change.

325 b: The communication server CSR retransmits that "NOTIFY: DevicesUpdated" message to the SIP device D2 of the terminal T1.

325 c: The SIP device D2 of the terminal T1 retransmits that "NOTIFY: DevicesUpdated" message to the call manager CH.

Figure 4:
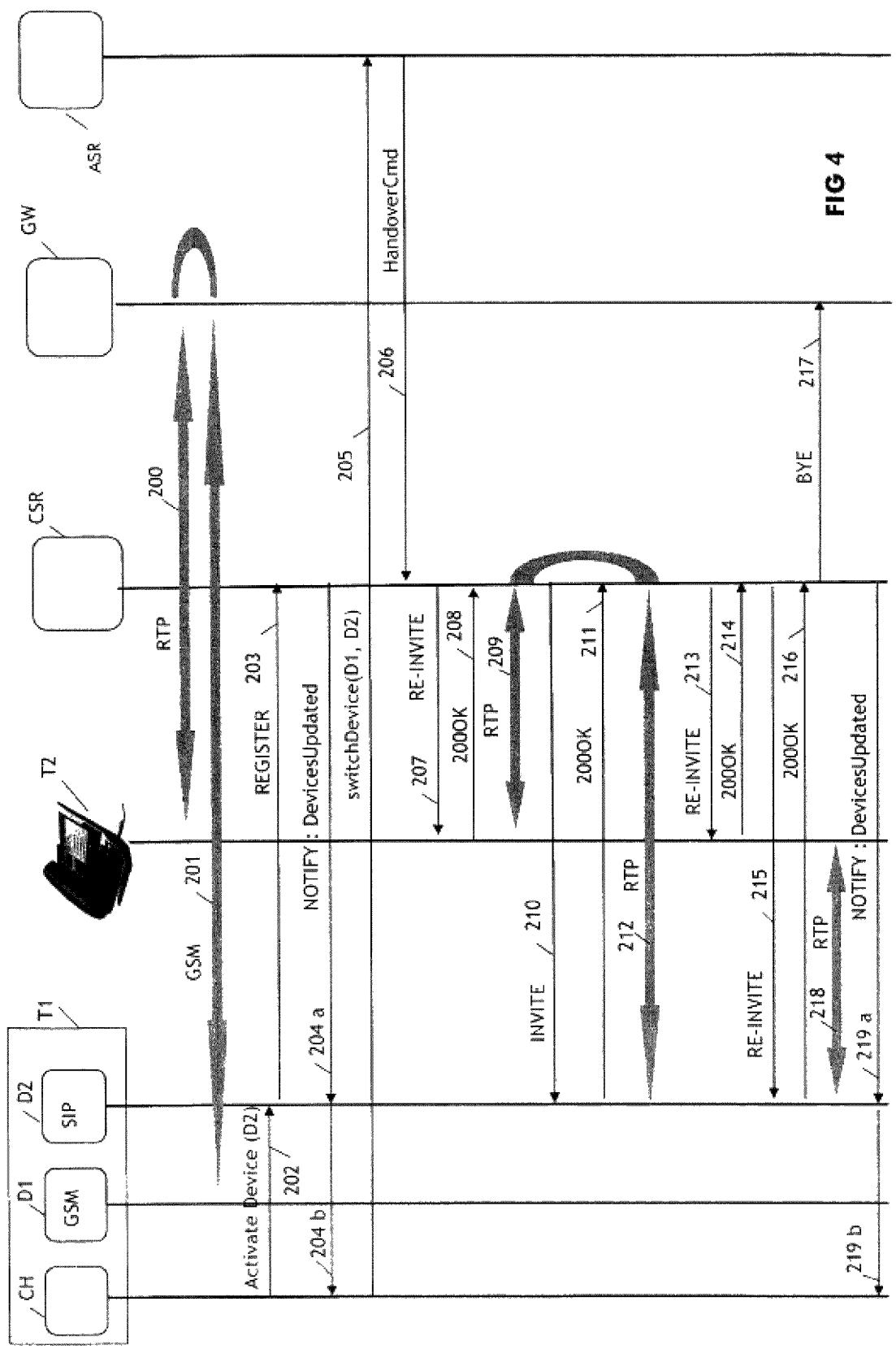
FIG. 4 depicts signal exchanges within an example call transfer from a GSM network to a SIP/Wi-Fi network, triggered by the terminal.

FIG. 4 depicts signal exchanges within an example call transfer from a GSM network to a SIP/Wi-Fi network, triggered by the terminal:

200, 201: A call was established between the GSM device D1 of the terminal T1 and any terminal T2 linked to the public fixed-line network PSTN. This call comprises a first VOIP part, denoted 200, using the RTP (Real Time Transport Protocol) protocol to transport voice signals between the terminal T2 and the gateway GW via the communication server CSR; and a second part 202 using the GSM protocol stake to transport voice signals between the GSM device, D1, of the terminal T1 and the gateway GW.

202: When the terminal T1 detects that it has entered the coverage area of the SIP/WIFI local area network, the call manager CH of the terminal T1 sends the SIP device D2 an "Activate Device (D2)" order to activate it.

203: Next, the SIP device D2 of the terminal T1 sends a "REGISTER" message to the communication server CSR, within the company communication system CSY. This REGISTER message contains the URI (Universal Resource Identifier) identifier of the SIP device D2. This message is interpreted by the communication server CSR as meaning that the SIP device D2 has been activated. In other words, a call must now only pass through the SIP/WIFI local area network.

204 a: The communication server CSR responds to the SIP device D2 of the terminal T1 with a "NOTIFY: Devices updated" message, which indicates that it has saved that fact that the SIP device D2 has been activated.

204 b: The SIP device D2 retransmits that "NOTIFY: Devices updated" message to the call manager CH.

205: The call manager CH may then ask the application server ASR that is incorporated into the company communication system CSY, to transfer the current call from the GSM global network to the SIP/WIFI local area network. It makes this request by sending a service request message "switchDevice (D1, D2)" via the data transmission interface HTTPI and the interface PSI. This data transmission network may be a GPRS, EDGE, CDMA, or HSDPA global network, or it may be the company in question's SIP/WIFI wireless local area network.

206: The application server ASR then sends a "HandoverCmd" message to the communication server CSR. This message is interpreted by the communication server CSR as meaning that it must transfer (hand over) a call to the SIP device D2 that had just been activated.

207: The communication server CSR transfers the call, starting by establishing a new call between the terminal T2 and the terminal T1 via the SIP/WIFI local area network, by sending a "RE-INVITE" message to the terminal T2. This message asks for its permission to modify the current session in order to create a three-party conference.

208: The terminal T2 responds with a 200OK acceptance message.

209: A first part of a new VOIP call is then established between the terminal T2 and the communication server CSR (via a gateway, not shown here, incorporated into the public fixed-line network PSTN). It is supported by the RTP protocol.

210: The communication server CSR sends an INVITE message to the SIP device D2 of the terminal T1 to establish a second part of the new call, via the SIP/WIFI local area network.

211: The SIP device D2 of the terminal T1 responds with a 200OK acceptance message. The terminal T1 connects its human-machine interfaces (microphone, monitor, video player) to the SIP device D2.

212: A second part of the new VOIP call is then established between the SIP device D2 of the terminal T1 and the communication server CSR. It is supported by the RTP protocol. The new call 209-212 is then established between the terminals T1 and T2, going through the SIP/WIFI local area network. Temporarily, the communication server CSR connects the old call 200-201 and the new call 209-212 so that the terminal T2 is in a three-party conference, with the GSM device D1 and the SIP device D2 of the terminal T1.

213: The communication server CSR sends a "RE-INVITE" message to the terminal T2 via the SIP/WIFI local area network. This message asks it for permission to modify the current session.

214: The terminal T2 responds with a 200OK acceptance message.

215: The communication server CSR sends a "RE-INVITE" message to the SIP device D2 of the terminal T1. This message asks it for permission to modify the current session.

216: The SIP device D2 of the terminal T1 responds with a 200OK acceptance message.

217: The communication server CSR sends a "BYE" message to the gateway GW in order to release the old call via the GSM global network. The terminal T1 deactivates the GSM device D1.

218: A VOIP call supported by the RTP protocol is then directly established between the terminal T2 and the SIP device D2 of the terminal T1.

219 a: The communication server CSR sends a "NOTIFY: DevicesUpdated" message to the SIP device D2 of the terminal T1 to indicate to it that it has saved the fact that the GSM device D1 had been disabled.

219 b: The SIP device D2 retransmits that "NOTIFY: DevicesUpdated" message to the call manager CH.

Figure 5:
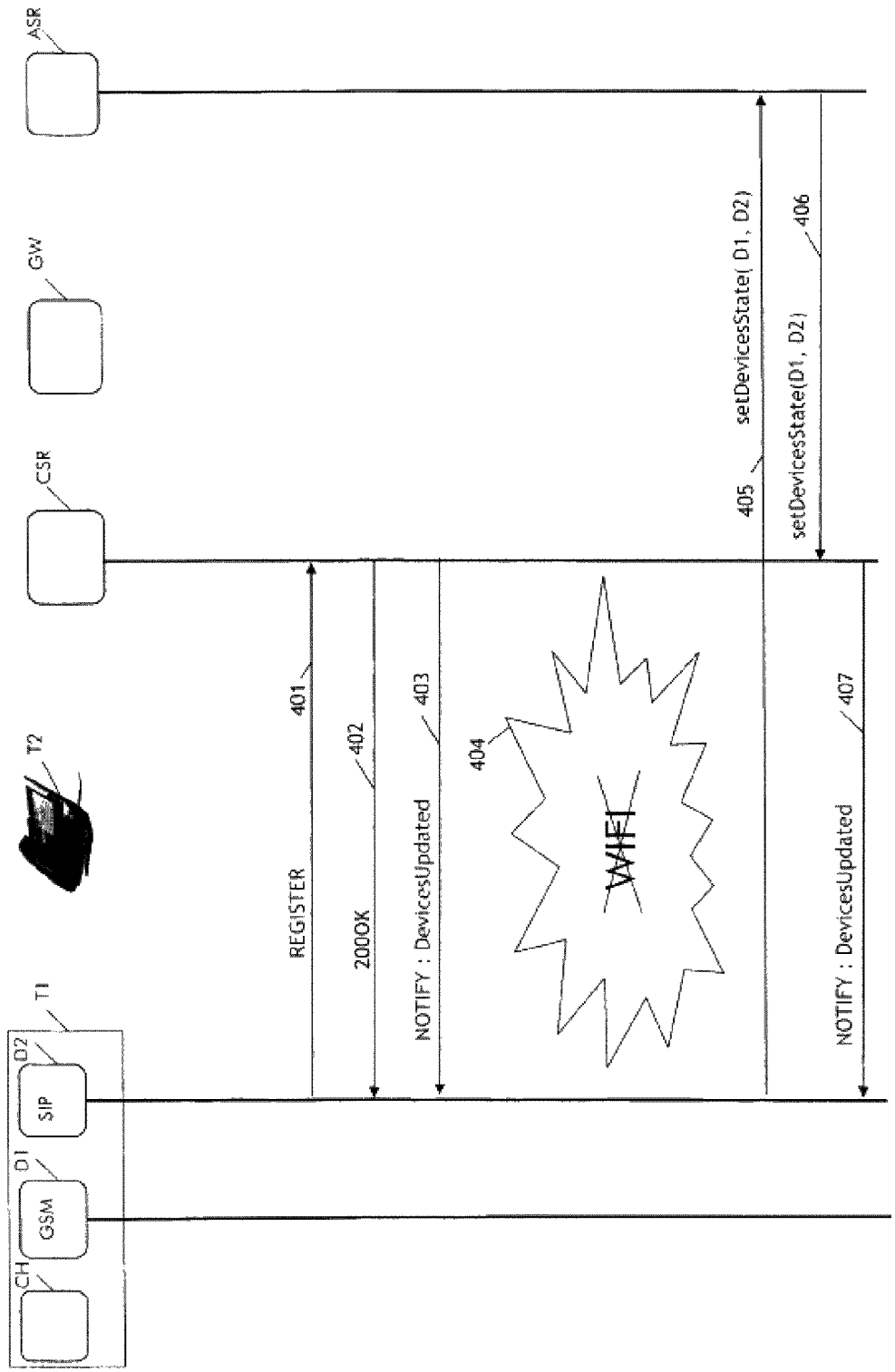
FIG. 5 depicts signal exchanges in an example of moving a dual-mode terminal from a Wi-Fi network to a GSM network, in order to deactivate a SIP/WiFi device and activate a GSM device in its place, whenever no telephone call is underway.

FIG. 5 depicts signal exchanges in an example of moving a dual-mode terminal from a GSM network to a SIP/WiFi network, with a SIP/WiFi device activated, then from a SIP/WiFi network to a GSM network, in order to deactivate the SIP/WiFI device and activate a GSM device in its place, whenever no telephone call is underway:

401: At the moment in question, the GSM device D1 is activated, while the SIP device D2 is deactivated. The terminal T1 detects that it is entering the coverage area of the SIP/WIFI local area network, while there is no telephone call underway. Upon the request of the call manager CH, the SIP device D2 then sends a "REGISTER" message to the call server CSR. This message is interpreted by the communication server CSR as indicating that the terminal T1 has activated its SIP device D2. The communication server CSR saves this state change. In other words, any communication must now pass only through the network supporting the SIP communication protocol, in this case the SIP/WiFi local area network in this example.

402: The communication server CSR sends a "200OK" message as an acknowledgement of receipt to the SIP device D2. This confirmation also means that the communication server CSR has saved the fact that the GSM device D1 is disabled.

403: Next, the communication server CSR sends a "NOTIFY: DevicesUpdated" message to the SIP device D2 to confirm that it did indeed record the state change of the terminal T1.

404: Later, the terminal T1 detects that it is leaving the coverage area of the SIP/WIFI local area network, while there is still no telephone call underway.

405: The communication manager CH then sends through the data transmission interface HTTPI and the interface PSI, a "SetDevicesState (D1, D2)" message to the application server ASR. This message contains the URI (Universal Resource Identifier) identifier of the SIP device D2 as well as the IMEI (International Mobile Equipment Identity) identifier of the GSM device D1. This message is interpreted by the application server ASR as meaning that the GSM device D1 has been activated, and that the SIP device D2 has been deactivated. In other words, any call must only pass through the GSM global network.

406: The application server ASR saves this state change of the SIP device D2 of the terminal T1. It acknowledges receipt by sending a "NOTIFY: DevicesUpdated" message to the communication server CSR. The communication server CSR saves this state change.

407 *b*: The communication server CSR retransmits that "NOTIFY: DevicesUpdated" message to the SIP device D2 of the terminal T1 as an acknowledgement of receipt. This message is relayed to the communication manager CH in order to centralize the availability information of the communication devices.

Figure 6:
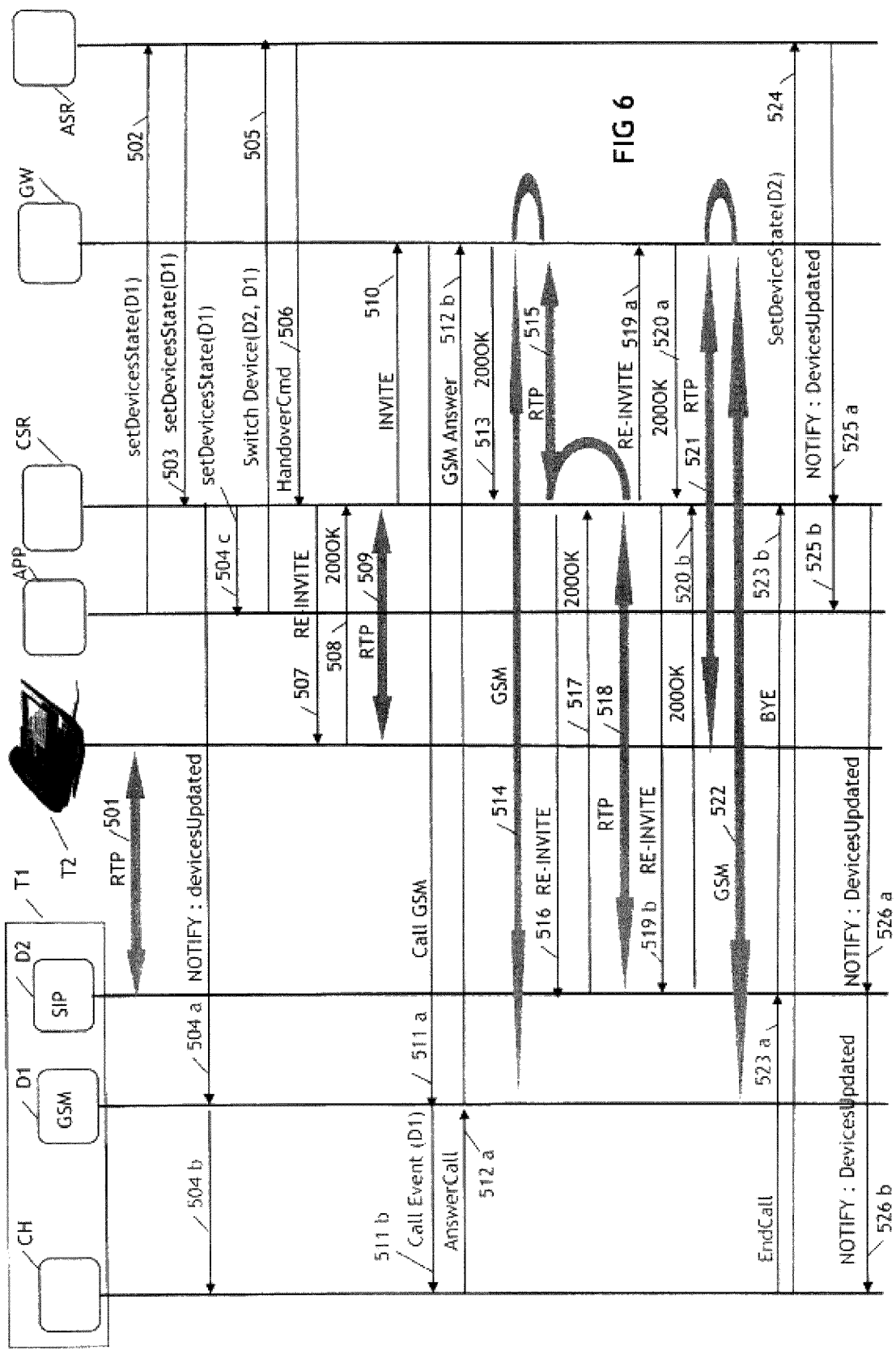
FIG. 6 depicts signal exchanges in an example call transfer from a SIP/Wi-Fi network to a GSM network, triggered by a third-party application run by a remote server.

FIG. 6 depicts the signal exchanges in an example transfer of a call from a SIP/WiFi local area network to a GSM global network, triggered by a third-party application APP, run by a remote server, that knows the current location of the terminal T1.

501: A VOIP call was established between the SIP device D2 of the terminal T1 and any terminal T2 linked to the public fixed-line network PSTN. This call uses the RTP protocol to carry voice signals.

502: The application APP detects that the terminal T1 is leaving the coverage area of the WLAN network. It then decides to activate the GSM device D1 and trigger a call transfer from the WLAN local area network to the global network. To order the communication server CSR to make that transfer, it sends the application server ASR a "SetDevicesState (D1)" message. This message contains the IMEI (International Mobile Equipment Identity) identifier of the GSM device D1. This message is interpreted by the application server ASR as meaning that the GSM device D1 has been activated. In other words, a call may go through the global network GSM.

503: The application server ASR retransmits the "SetDevicesState (D1)" message to the communication server CSR.

504 *a*: The communication server CSR sends a "NOTIFY: DevicesUpdated" message to the SIP device D2 to activate the GSM device D1.

504 *b*: The SIP device D2 retransmits that "NOTIFY: DevicesUpdated" message to the call manager CH which activates the GSM device D1.

504 *b*: The communication server CSR sends a "NOTIFY: DevicesUpdated" message to the application APP to confirm that the GSM device D1 has been activated.

505: The application APP sends the application server ASR, via a data transmission interface, a "switchDevice (D2, D1)" message to request that the call be transferred to the GSM network.

506: The application server ASR then sends a "HandoverCmd" message to the communication server CSR. This message is interpreted by the communication server CSR as meaning that it must transfer (hand over) a call to the GSM device D1 that had just been activated.

507: The communication server CSR transfers the call, starting by establishing a new call between the terminal T2 and the terminal T1 via the global network GSM, by sending a "RE-INVITE" message to the terminal T2. This message asks for its permission to modify the current session in order to create a three-party conference.

508: The terminal T2 responds with a 200OK acceptance message.

509: A new VOIP call, supported by the RTP protocol, is then established between the terminal T2 and the communication server CSR, via a gateway not shown here, incorporated into the public fixed-line network PSTN.

510: The communication server CSR sends an "INVITE" message to the gateway GW, in order to establish a new communication via the GSM global network.

511 *a*: The gateway GW sends a "Call GSM" message to the GSM device D1 of the terminal T1.

511 *b*: The GSM device D1 then sends a "Call Event (D1)" message to the call manager CH in order to inform it of an incoming call.

512 *a*: The call manager CH analyzes that message and decides that it corresponds to transferring a current call to a new device and responds to the GSM device D1 with an "AnswerCall" message that orders it to take the call.

512 *b*: The GSM device D1 takes the call: It responds by sending the gateway GW a "GSM Answer" message.

513: The gateway GW converts that "GSM Answer" message into a "200OK" message that it sends to the communication server CSR.

514, 515: A new call is established between the GSM device D1 of the terminal T1, and the communication server CSR, via the gateway GW. A first part 314, of that new call uses the GSM protocols to transport voice signals between the GSM device D1 of the terminal T1 and the gateway GW. A second part 315 of that new call uses the RTP protocol to transport voice signals from the gateway GW to the communication server CSR.

516: The communication server sends a "RE-INVITE" message to the SIP device D2 of the terminal T1 in order to request a change to the current session, in order to create a three-party conference.

517: The SIP device D2 accepts by sending a "200OK" message to the communication server CSR.

518: Another new VOIP call is established between the communication server CSR and the SIP device D2 of the terminal T1. This call uses the RTP protocol to carry voice signals. Temporarily, the communication server CSR connects those two calls 514-515 and 518 so that the terminal T2 is conferencing with the GSM device D1 and the SIP device D2 of the terminal T1. The terminal T1, by the action of the call manager CH, connects its human-machine interfaces (microphone, monitor, video player) to the GSM device D1.

519: The communication server sends a "RE-INVITE" message to the gateway GW in order to modify the sessions that are underway so that the call between the GSM device D1 and the terminal T2 no longer goes through a communication server CSR but rather only through the gateway GW.

520: The gateway responds with a "200OK" message.

521, 522: A call then links the terminal T2 and the GSM device D1 via the gateway GW. A VOIP part of that call denoted 521, between the terminal T2 and the gateway GW, is supported by the RTP protocol. A second part of that call 522, between the gateway GW and the GSM device D1 of the terminal T1, is supported by the GSM protocols. A new call is therefore established between the terminals T1 and T2, going through the global network GSM.

523 a: The call manager CH ends the existing call between the terminal T2 and the D2 device SIP by sending an "D2" message to that SIP device D2.

523 b: The SIP device D2 then sends a "BYE" message to the communication server CSR in order to ask it to release the communication via the WLAN local area network.

524: The call manager CH also sends a "SetDeviceState (D2)" message to the application server ASR, via the GSM device D1, to indicate that the SIP device D2 will be deactivated. This message may also be replaced by an UNREGISTER SIP message that indicates that the SIP device D2 is no longer accessible. The application server ASR saves this state change of the SIP device D2 of the terminal T1.

525 a: The application server ASR indicates that it has saved the fact that the SIP device D2 is no longer activated, by sending a "NOTIFY: DevicesUpdated" message to the communication server CSR. The communication server CSR saves this state change.

525 b: The communication server CSR retransmits that "NOTIFY: DevicesUpdated" message to the application APP.

526 a: The communication server CSR retransmits that "NOTIFY: DevicesUpdated" message to the SIP device D2 of the terminal T1.

526 b: The SIP device D2 of the terminal T1 retransmits that "NOTIFY: DevicesUpdated" message to the call manager CH.

Figure 7:
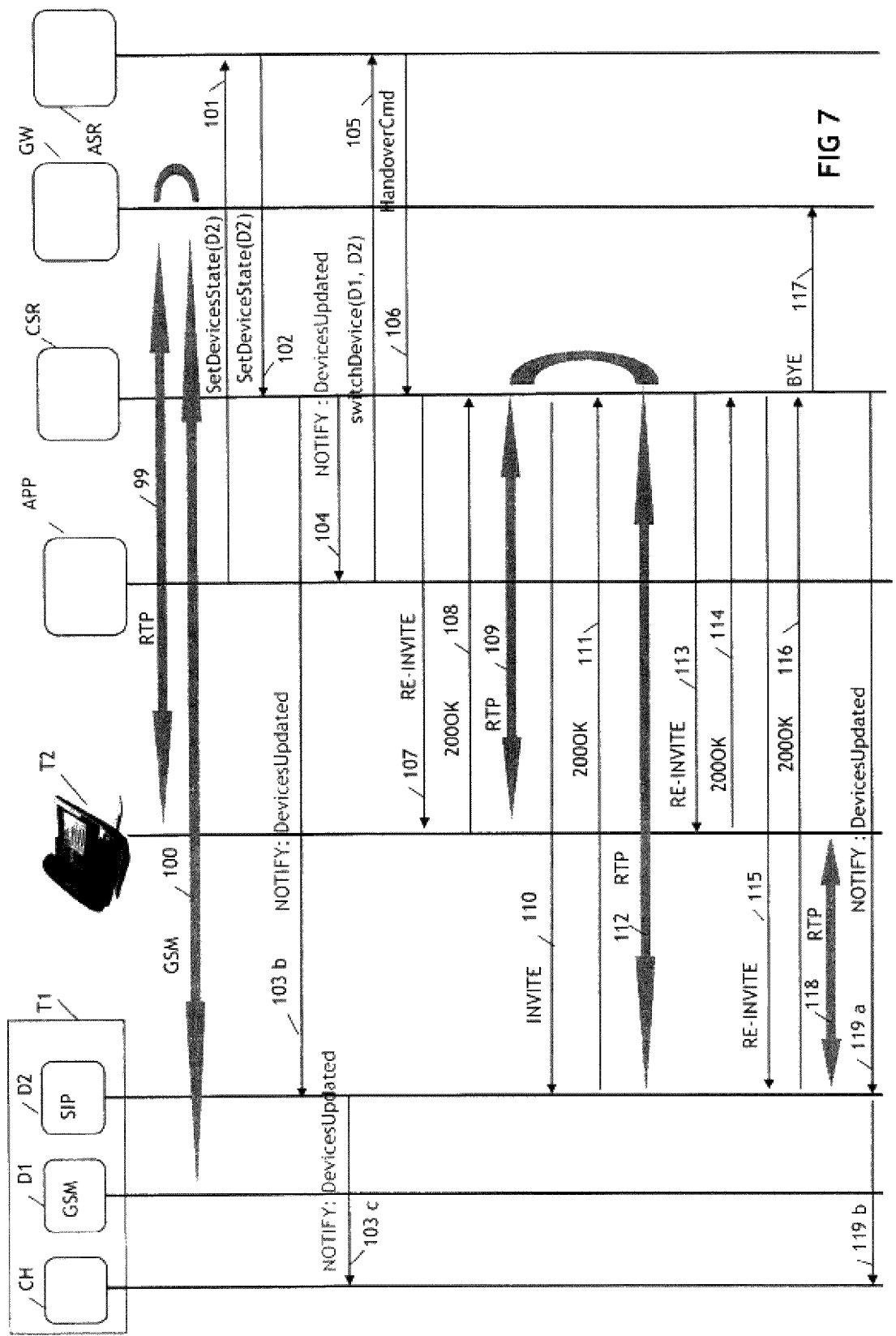
FIG. 7 depicts signal exchanges in an example call transfer from a GSM network to a SIP/Wi-Fi network, triggered by a third-party application run by a remote server.

FIG. 7 depicts the signal exchanges in an example transfer of a call from a GSM local area network to a SIP/WiFi global network, triggered by a third-party application APP, run by a remote server, that knows the current location of the terminal T1. A call was established between the GSM device D1 of the terminal T1 and any terminal T2 linked to the public fixed-line network PSTN.

99, 100: This call comprises a first VOIP part, denoted 99, using the RTP (Real Time Transport Protocol) protocol to transport voice signals between the terminal T2 and the gateway GW via the communication server CSR; and a second part, denoted 100, using the GSM protocol stake to transport voice signals between the GSM device, D1, of the terminal T1 and the gateway GW.

101: When the application APP detects that the terminal T1 is entering the coverage area of the WLAN local area network, it sends a "SetDeviceState (D2)" message to the application server ASR to indicate to it that the SIP device D2 of the terminal T1 will be activated.

102: The application server ASR retransmits that "SetDeviceState (D2)" message to the communication server CSR. This message contains the URI (Universal Resource Identifier) identifier of the SIP device D2. This message is interpreted by the communication server CSR as meaning that the SIP device D2 has been activated. In other words, a call must now only pass through the SIP/WiFi local area network.

103 a: Next, the communication server CSR sends a "NOTIFY: DevicesUpdated" message to the SIP device D2.

103 b: The SIP device D2 retransmits that "NOTIFY: DevicesUpdated" message to the call manager CH to indicate to it that the application server ASR has saved the fact that the SIP device D2 is activated.

104: The communication server CSR sends the same "NOTIFY: Devices updated" message to the application APP to indicate to it that the SIP device D2 has been activated.

105: The application APP then asks the application server ASR to transfer the current call, from the GSM global network to the SIP/WiFi local area network, by sending a "switchDevice (D1, D2)" service request message, via a data transmission interface that uses a data transmission network. This data transmission network may be a GPRS, EDGE, CDMA, or HSDPA global network, or it may be the company in question's wireless local area network WLAN, or a wired local or global network.

106: The application server ASR then sends a "HandoverCmd" message to the communication server CSR. This message is interpreted by the communication server CSR as meaning that it must transfer (hand over) a call to the SIP device D2 that had just been activated.

107: The communication server CSR transfers the call, starting by establishing a new call between the terminal T2 and the terminal T1 via the SIP/WiFi local area network, by sending a "RE-INVITE" message to the terminal T2. This message asks for its permission to modify the current session in order to create a three-party conference.

108: The terminal T2 responds with a 200OK acceptance message.

109: A first part of a new VOIP call is then established between the terminal T2 and the communication server CSR (via a gateway, not shown here, incorporated into the public fixed-line network PSTN). It is supported by the RTP protocol.

110: The communication server CSR sends an INVITE message to the SIP device D2 of the terminal T1 to establish a second part of the new call, via the SIP/WiFi local area network.

111: The SIP device D2 of the terminal T1 responds with a 200OK acceptance message. The terminal T1 connects its human-machine interfaces (microphone, monitor, video player) to the SIP device D2.

112: A second part of the new VOIP call is then established between the SIP device D2 of the terminal T1 and the communication server CSR. It is supported by the RTP protocol. The new call 209-212 is then established between the terminals T1 and T2, going through the SIP/WiFi local area network. Temporarily, the communication server CSR connects the call 200-201 and the call 209-212 so that the terminal T2 is in a three-party conference, with the GSM device D1 and the SIP device D2 of the terminal T1.

113: The communication server CSR sends a "RE-INVITE" message to the terminal T2 via the WLAN local area network. This message asks it for permission to modify the current session.

114: The terminal T2 responds with a 200OK acceptance message.

115: The communication server CSR sends a "RE-INVITE" message to the SIP device D2 of the terminal T1. This message asks it for permission to modify the current session.

116: The SIP device D2 of the terminal T1 responds with a 200OK acceptance message.

117: The communication server CSR sends a "BYE" message to the gateway GW in order to release it. The call via the GSM global network is thereby closed. The terminal T1 deactivates the GSM device D1.

118: A VOIP call supported by the RTP protocol is then directly established between the terminal T2 and the SIP device D2 of the terminal T1.

119 a: The communication server CSR sends a "NOTIFY: DevicesUpdated" message to the SIP device D2 of the terminal T1 to indicate to it that it has saved the fact that the GSM device D1 had been disabled.

119 b: The SIP device D2 retransmits that "NOTIFY: DevicesUpdated" message to the call manager CH.

Figure 8:
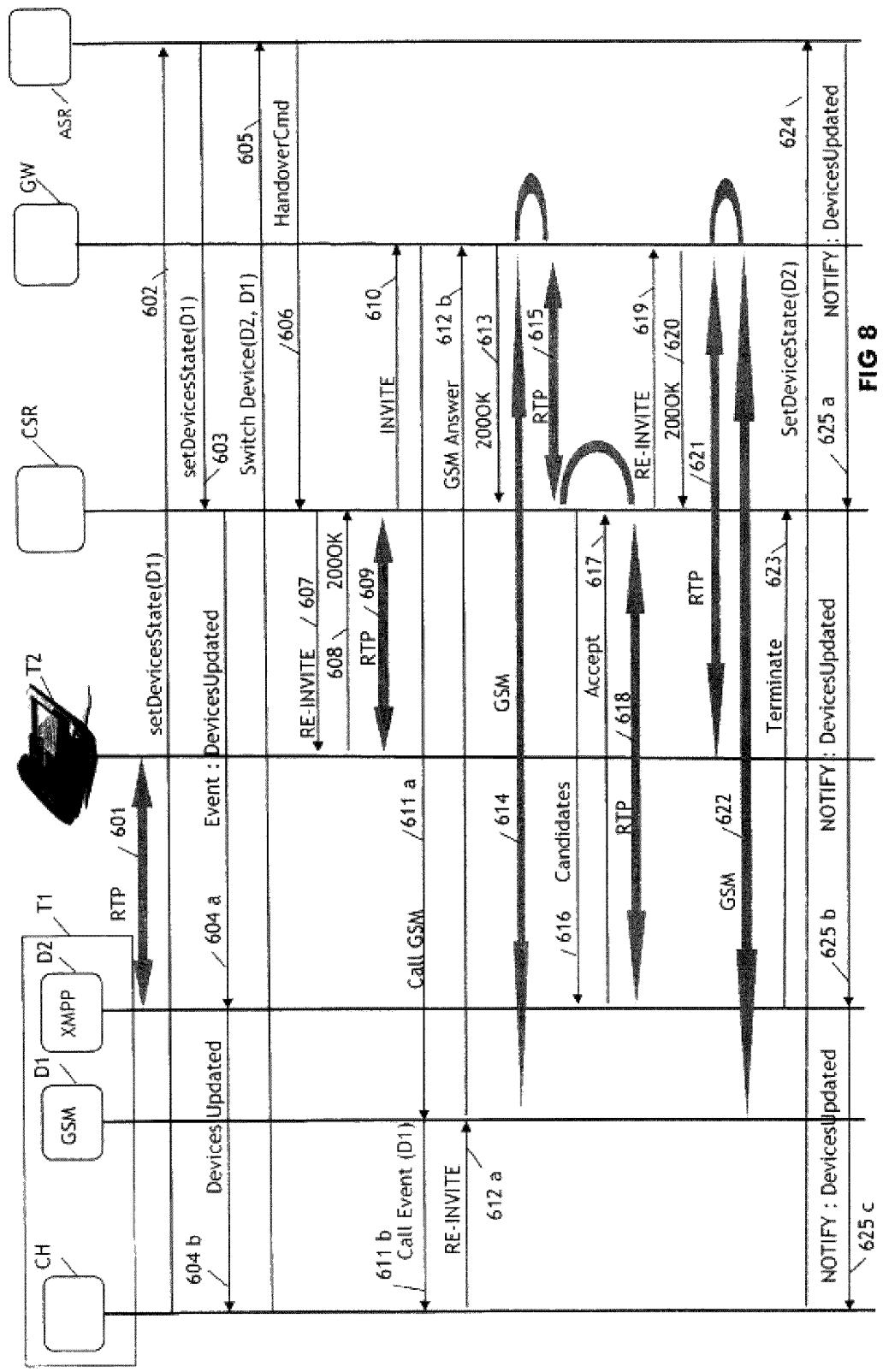
FIG. 8 depicts signal exchanges in an example call transfer from an XMPP/LTE (Extensible Messaging and Presence Protocol/Long Term Evolution) network to a GSM network, triggered by the terminal.

FIG. 8 depicts signal exchanges in an example call transfer from an XMPP/LTE (Extensible Messaging and Presence Protocol/Long Term Evolution) network to a GSM network, triggered by the terminal.

601: A VOIP with established between the XMPP device D2 of the terminal T1 and any terminal T2 linked to the public fixed-line network PSTN. This call uses the RTP protocol to carry voice signals. The XMPP device D2 is activated.

602: The terminal T1 detects that it is leaving the coverage area of the XMPP/LTE network. The call manager CH of the terminal T1 then activates the GSM device D1 and decides to trigger a call transfer from the local area network XMPP/LTE to the global network GSM. To order the communication server CSR to make that transfer, the call manager CH sends a "SetDevicesState (D1)" message to the application server ASR, via the interface HTTPI and the interface PSI. This message contains the IMEI (International Mobile Equipment Identity) identifier of the GSM device D1. This message is interpreted by the application server ASR as meaning that the GSM device D1 has been activated. In other words, a call may go through the global network GSM.

603: The application server ASR retransmits the "SetDevicesState (D1)" message to the communication server CSR.

604 a: The communication server CSR sends an "Event: DevicesUpdated" message to the GSM device D1 to indicate that it recorded that the GSM device D1 has been activated.

604 b: The XMPP device D1 retransmits that "NOTIFY: DevicesUpdated" message to the call manager CH.

605: The call manager CH sends the application server ASR, via the data transmission interface HTTPI and the interface PSI, a message "switchDevice (D2, D1)" in order to request that the call be transferred to the GSM network.

606: The application server ASR then sends a "HandoverCmd" message to the communication server CSR. This message is interpreted by the application server ASR as meaning that it must transfer (hand over) a call to the GSM device D1 that had just been activated.

607: The communication server CSR transfers the call, starting by establishing a new call between the terminal T2 and the terminal T1 via the GSM local area network, by sending a "RE-INVITE" message to the terminal T2. This message asks for its permission to modify the current session in order to create a three-party conference.

608: The terminal T2 responds with a 200OK acceptance message.

609: A new VOIP call, supported by the RTP protocol, is then established between the terminal T2 and the communication server CSR, via a gateway not shown here, incorporated into the public fixed-line network PSTN.

610: The communication server CSR sends an "INVITE" message to the gateway GW, in order to establish a new communication via the GSM global network.

611 a: The gateway GW sends a "Call GSM" message to the GSM device D1 of the terminal T1.

611 b: The GSM device D1 then sends a "Call Event (D1)" message to the call manager CH in order to inform it of an incoming call.

612 a: The call manager CH responds to the GSM device D1 with a "Answer Call" message that orders it to take the call.

612 b: The GSM device D1 takes the call: It responds by sending the gateway GW a "GSM Answer" message.

613: The gateway GW converts that "GSM Answer" message into a "200OK" message that it sends to the communication server CSR.

614, 615: A new call is established between the GSM device D1 of the terminal T1, and the communication server CSR, via the gateway GW. A first part, denoted 614, of that new call uses the GSM protocols to transport voice signals between the GSM device D1 of the terminal T1 and the gateway GW. A second VOIP part, denoted 615, of that new call uses the RTP protocol to transport voice signals from the gateway GW to the communication server CSR.

616: The communication server sends an "XMPP" message to the D2 device T1 of the terminal T1 in order to request a change to the current session, in order to create a three-party conference.

617: The XMPP device D2 accepts by sending a "200OK" message to the communication server CSR.

618: Another new VOIP call is established between the communication server CSR and the XMPP device D2 of the terminal T1. This call uses the RTP protocol to carry voice signals. Temporarily, the communication server CSR connects those two calls 614-615 and 618 so that the terminal T2 is conferencing with the GSM device D1 and the XMPP device D2 of the terminal T1. The terminal T1 connects its human-machine interfaces (microphone, monitor, video player) to the GSM device D1.

619: The communication server sends a "RE-INVITE" message to the gateway GW in order to modify the sessions that are underway so that the call between the GSM device D1 and the terminal T2 no longer goes through a communication server CSR but rather only through the gateway GW.

620: The gateway responds with a "200OK" message.

621, 622: A call then links the terminal T2 and the GSM device D1 via the gateway GW. A part 321 of that call, between the terminal T2 and the gateway GW, is supported by the RTP protocol. A second part of that call 322, between the gateway GW and the GSM device D1 of the terminal T1, is supported by the GSM protocols. A new call is therefore established between the terminals T1 and T2, going through the global network GSM.

623: The XMPP device D2 sends a "Terminate" message to the communication server CSR to ask it to release the call via the XMPP/LTE network.

624: The call manager CH also sends a "SetDeviceState (D2)" message to the application server ASR, via the GSM device D1, to indicate that the XMPP device D2 will be deactivated. The application server ASR saves this state change of the XMPP device D2 of the terminal T1.

625 a: The application server ASR acknowledges receipt by sending a "NOTIFY: DevicesUpdated" message to the communication server CSR. The communication server CSR saves this state change.

625 b: The communication server CSR retransmits that "NOTIFY: DevicesUpdated" message to the XMPP device D2 of the terminal T1.

625 c: The XMPP device D2 of the terminal T1 retransmits that "NOTIFY: DevicesUpdated" message to the call manager CH.

Figure 9:
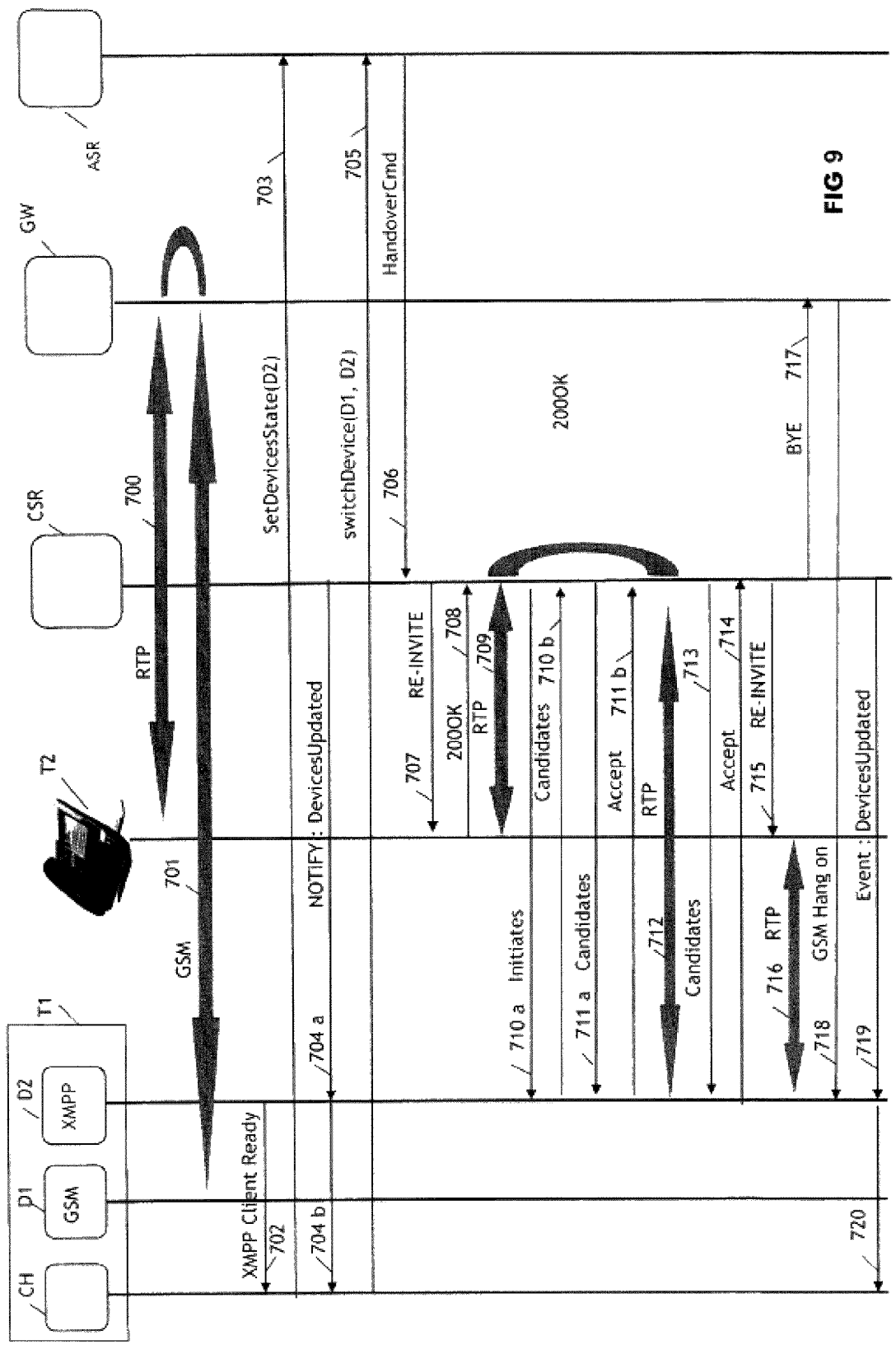
FIG. 9 depicts signal exchanges within an example call transfer from a GSM network to an XMPP/LTE network, triggered by the terminal.

FIG. 9 depicts signal exchanges within an example call transfer from a GSM network to an XMPP/LTE network, triggered by the terminal.

- 700, 701: A call was established between the GSM device D1 of the terminal T1 and any terminal T2 linked to the public fixed-line network PSTN. This call comprises a first VOIP part, denoted 200, using the RTP (Real Time Transport Protocol) protocol to transport voice signals between the terminal T2 and the gateway GW via the communication server CSR; and a second part 202 using the GSM protocol stake to transport voice signals between the GSM device, D1, of the terminal T1 and the gateway GW.
- 702: When the terminal T1 enters the coverage area of the LTE network, the XMPP device D2 registers with an XMPP server (not shown in the figure but included within the company communication system CSY) and sends an "XMPP Client Ready" message to the call manager CH of the terminal T1 to indicate to it that the XMPP device D2 is becoming active.
- 703: The call manager CH of the terminal T1 sends a "SetDevicesState (D2)" message to the application server ASR, within the company communication system CSY. This message contains the JID (Jabber Identifier) identifier of the XMPP device D2. This message is interpreted by the application server ASR as meaning that the XMPP device D2 has been activated. In other words, a call must now only pass through the XMPP/LTE network.
- 704 a: The communication server CSR responds to the XMPP device D2 of the terminal T1 with a "NOTIFY: Devices updated" message, which indicates that it has saved that fact that the XMPP device D2 has been activated.
- 704 b: The XMPP device D2 retransmits that "NOTIFY: Devices updated" message to the call manager CH.
- 705: The call manager CH may then ask the application server ASR that is incorporated into the company communication system CSY, to transfer the current call from the GSM global network to the XMPP/LTE network. It makes this request by sending a "switchDevice (D1, D2)" service request message, via the interface HTTPI and the interface PSI, using a data transmission network, preferentially the LTE network (This data transmission network may be a global GPRS, EDGE, CDMA, or HSDPA network, or it may be the wireless local area network of the company in question).
- 706: The application server ASR then sends a "HandoverCmd" message to the communication server CSR. This message is interpreted by the communication server CSR as meaning that it must transfer (hand over) a call to the XMPP device D2 that had just been activated.
- 707: The communication server CSR transfers the call, starting by establishing a new call between the terminal T2 and the terminal T1 via the XMPP/LTE local area network, by sending a "RE-INVITE" message to the terminal T2. This message asks for its permission to modify the current session in order to create a three-party conference.
- 708: The terminal T2 responds with a 200OK acceptance message.
- 709: A first part of a new VOIP call is then established between the terminal T2 and the communication server CSR (via a gateway, not shown here, incorporated into the public fixed-line network PSTN). It is supported by the RTP protocol.
- 710 a: The communication server CSR sends an "Initiates" message to the terminal T1 in order to establish a second part of the new call, via the XMPP/LTE network.
- 710 b: The XMPP device D2 accepts by sending a "Candidates" message to the communication server CSR.
- 711 a: The communication server CSR sends a "Candidates" message to the XMPP device D2 of the terminal T1 in order to establish a second part of the new call, via the XMPP/LTE network.
- 711 b: The XMPP device D2 accepts by sending an "Accept" message to the communication server CSR.
- 712: A second part of the new VOIP call is then established between the XMPP device D2 of the terminal T1 and the communication server CSR. It is supported by the RTP protocol. The new call 709-712 is then established between the terminals T1 and T2, going through the XMPP/LTE local area network. Temporarily, the communication server CSR connects the call 700-701 and the call 709-712 so that the terminal T2 is in a three-party conference, with the GSM device D1 and the XMPP device D2 of the terminal T1.
- 713: The communication server CSR sends a "Candidates" message to the XMPP device D2 of the terminal T1. This message asks it to modify the current session in order to make a direct RTP link with the terminal T2. Next, the communication server CSR ends the conference.
- 714: The XMPP device D2 accepts by sending a "200OK" message to the communication server CSR.
- 715: The communication server CSR sends a "RE-INVITE" message to the terminal T2. This message asks for its permission to modify the current session in order to create a direct RTP link with the XMPP device D2 of the terminal T1
- 716: A VOIP call supported by the RTP protocol is then directly established between the terminal T2 and the XMPP device D2 of the terminal T1.
- 717: The communication server CSR sends a "BYE" message to the gateway GW in order to release it. The call via the GSM global network is thereby closed. The terminal T1 deactivates the GSM device D1.
- 718: The gateway GW sends a "GSM Hang on" message to the XMPP device D2 in order to confirm that it closed communication via the GSM network.
- 719: The communication server CSR sends an "Event" message to the XMPP device D2 of the terminal T1 to indicate to it that it has saved the fact that the GSM device D1 had been disabled.
- 720: The XMPP device D2 retransmits that "Event: DevicesUpdated" message to the call manager CH.

The invention claimed is:

1. A multi mode mobile telephone terminal allowing the transfer of a telephone call from one wireless network to another, comprising:
   an interface configured to support circuit-switched calls, comprising a plurality of communication devices corresponding to different protocols for circuit-switched calls;
   an interface configured to support packet-switched calls, comprising a plurality of communication devices corresponding to different protocols for packet-switched calls;
   a call transfer manager configured to decide on call transfers;

an access monitor configured to activate or deactivate the devices that said interfaces comprise, based on:
information on the state of those devices' availability,
the type and state of the radio connectivity offered by the terminal,
and preferences defined by a user or mobile fleet administrator;
a call manager configured to:
manage the calls presented to the user based on the current status of the devices that the interface comprises to support circuit-switched calls, and that the interface comprises to support packet-switched calls,
and manage the switchover of a multimedia session, should the need arise, from one device to another based on signals from the call transfer manager;
wherein said plurality of communication devices corresponding to different protocols for circuit-switched calls are configured to establish multimedia sessions,
wherein said plurality of communication devices corresponding to different protocols for packet-switched calls are configured to establish multimedia sessions,
wherein the call manager comprises an abstraction layer that makes it possible to exchange generic commands and generic information with at least one communication device that the interface may comprise to support circuit-switched calls, and that the interface may comprise to support packet-switched calls;
wherein said abstraction layer that makes it possible to exchange generic commands and generic information is configured to:
activate and deactivate the communication devices,
initiate, accept, and end a multimedia session;
and check the current state of the communication devices.

2. The terminal according to claim 1, wherein said abstraction layer that makes it possible to exchange generic commands and generic information is configured to register the call manager with the communication devices in order to be able to transmit to the call manager the notifications related to the current state of the communication sessions.

3. The terminal according to claim 2, wherein said abstraction layer that makes it possible to exchange genetic orders and generic orders is configured to characterize the multimedia sessions established by way of the communication devices in order to make it possible to associate said sessions with a single call being transferred.

4. The terminal according to claim 1, wherein the call manager is configured to associate a plurality of multimedia sessions established through communication devices with an single call being transferred.

* * * * *